(12) United States Patent
Weh

(10) Patent No.: US 12,397,761 B2
(45) Date of Patent: Aug. 26, 2025

(54) ELECTROHYDRAULIC POWER BRAKE SYSTEM FOR A MOTOR VEHICLE TRAVELING AUTONOMOUSLY

(71) Applicant: Robert Bosch GmbH, Stuttgart (DE)

(72) Inventor: Andreas Weh, Sulzberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 314 days.

(21) Appl. No.: 17/648,519

(22) Filed: Jan. 20, 2022

(65) Prior Publication Data

US 2022/0258710 A1 Aug. 18, 2022

(30) Foreign Application Priority Data

Feb. 18, 2021 (DE) ...................... 10 2021 201 536.0

(51) Int. Cl.
| | |
|---|---|
| *B60T 8/94* | (2006.01) |
| *B60T 7/04* | (2006.01) |
| *B60T 7/12* | (2006.01) |
| *B60T 13/62* | (2006.01) |
| *B60T 13/66* | (2006.01) |

(52) U.S. Cl.
CPC ................ *B60T 8/94* (2013.01); *B60T 7/042* (2013.01); *B60T 7/12* (2013.01); *B60T 13/62* (2013.01); *B60T 13/662* (2013.01); *B60T 2270/402* (2013.01)

(58) Field of Classification Search
CPC ... B60T 8/94; B60T 7/042; B60T 7/12; B60T 13/62; B60T 13/662; B60T 2270/402; B60T 13/686; B60T 13/745; B60T 7/22; B60T 13/70; B60T 13/142; B60T 13/148
See application file for complete search history.

(56) References Cited

U.S. PATENT DOCUMENTS

| | | | | |
|---|---|---|---|---|
| 4,072,360 | A * | 2/1978 | Carroll .................... | B60T 13/22 303/2 |
| 6,318,817 | B1 * | 11/2001 | Martin .................. | B60T 13/686 303/116.1 |
| 9,145,119 | B2 * | 9/2015 | Biller ......................... | B60T 8/17 |
| 10,166,964 | B2 * | 1/2019 | Lesinski, Jr. ........... | B60T 8/885 |
| 10,358,119 | B2 * | 7/2019 | Besier ................... | B60T 13/142 |
| 2004/0090115 | A1 * | 5/2004 | Inoue ...................... | B60T 8/368 303/DIG. 10 |
| 2010/0206673 | A1 * | 8/2010 | Hitzel ..................... | B60T 8/267 188/106 R |

(Continued)

FOREIGN PATENT DOCUMENTS

WO 2012143312 A1 10/2012

*Primary Examiner* — Robert A. Siconolfi
*Assistant Examiner* — James K Hsiao
(74) *Attorney, Agent, or Firm* — NORTON ROSE FULBRIGHT US LLP

(57) ABSTRACT

An electrohydraulic power brake system for a motor vehicle traveling autonomously. An auxiliary brake unit is connected to a service brake unit in such a manner, that in the event of failure of the service brake unit, the vehicle brake system may be operated by the auxiliary brake unit. In order to be able to build up a brake pressure rapidly, using the auxiliary brake unit, in the case of cold and viscous brake fluid, as well, check valves, via which hydraulic pumps of the auxiliary brake unit are connected to a brake fluid reservoir of the service brake unit, are provided in the service brake unit.

15 Claims, 3 Drawing Sheets

(56) References Cited

U.S. PATENT DOCUMENTS

| | | | | |
|---|---|---|---|---|
| 2010/0282549 | A1* | 11/2010 | Feigel | B60T 8/4072 |
| | | | | 188/110 |
| 2014/0203626 | A1* | 7/2014 | Biller | B60T 7/02 |
| | | | | 303/14 |
| 2016/0009267 | A1* | 1/2016 | Lesinski, Jr. | B60T 7/12 |
| | | | | 303/10 |
| 2016/0023644 | A1* | 1/2016 | Feigel | B60T 8/4081 |
| | | | | 303/3 |
| 2017/0274884 | A1* | 9/2017 | Besier | B60T 13/686 |
| 2017/0282877 | A1* | 10/2017 | Besier | B60T 8/885 |
| 2017/0361825 | A1* | 12/2017 | Drumm | B60T 8/4081 |
| 2018/0162332 | A1* | 6/2018 | Nakazawa | B60T 7/22 |
| 2019/0344767 | A1* | 11/2019 | Bareiss | B60T 7/12 |
| 2019/0344769 | A1* | 11/2019 | Zimmermann | B60T 8/326 |
| 2021/0070267 | A1* | 3/2021 | Weh | B60T 8/4081 |
| 2024/0001899 | A1* | 1/2024 | Stanojkovski | B60T 13/686 |

* cited by examiner

ELECTROHYDRAULIC POWER BRAKE SYSTEM FOR A MOTOR VEHICLE TRAVELING AUTONOMOUSLY

CROSS REFERENCE

The present application claims the benefit under 35 U.S.C. § 119 of German Patent Application DE 10 2021 201 536.0 filed on Feb. 18, 2021, which is expressly incorporated herein by reference in its entirety.

FIELD

The present invention relates to an electrohydraulic power brake system for a motor vehicle traveling autonomously.

BACKGROUND INFORMATION

In order to travel autonomously up to Level 4 (driver may be called upon to intervene) and Level 5 (highest level; no driver is required), a power brake system is necessary, which has redundancy and precludes a complete failure of the vehicle brake system at a probability bordering on certainty.

PCT Patent Application No. WO 2012/143 312 A1 describes an electrohydraulic power brake system including a service brake unit and a brake pressure control unit. The service brake unit includes a master brake cylinder manipulable by muscle power, and a piston-cylinder unit, whose piston is displaceable in a cylinder by an electric motor, via a screw drive, as an externally-powered brake pressure generator, which is connected hydraulically in parallel with the master brake cylinder. An unpressurized brake fluid reservoir, to which the master brake cylinder and the externally-powered brake pressure generator are connected, is mounted on the service brake unit. The brake pressure control unit includes solenoid valves and a hydraulic pump in each brake circuit to regulate the wheel brake pressure of the wheels individually. The brake pressure control unit is connected to the service brake unit, and hydraulic wheel brakes are connected to the brake pressure control unit.

SUMMARY

An electrohydraulic power brake system of the present invention is intended for autonomous driving on public roads, up to Levels 4 and 5. Level 4 is also referred to as highly automated driving and means that the control of a vehicle is taken on permanently by an electronic system, and that a driver is only called upon to intervene, if the system is no longer able to cope with the driving tasks. Level 5 is also referred to as complete automation and does not require a driver.

In accordance with an example embodiment of the present invention, the vehicle brake system includes a service brake unit, to which one or more hydraulic wheel brakes are connected, as well as an auxiliary brake unit. The wheel brake(s) are normally actuated by the service brake unit, which is referred to as service braking. In order to actuate the wheel brake(s), the service brake unit includes a brake pressure generator for generating a brake pressure, and one or more brake-pressure control valve set-ups, with the aid of which wheel brake pressures in the wheel brakes are regulated. "Regulation" is also to be understood as control. Preferably, the wheel brake pressure in each wheel brake is regulated individually, but wheel brake pressures in groups of wheel brakes may also be regulated jointly, or the wheel brake pressure of all of the wheel brakes may be regulated jointly. A level of the wheel brake pressures, and thus, of the braking forces of the wheel brakes, is regulated. In addition, a traction control system, an electronic stability program, which is often referred to as colloquially as "anti-skid control," automatic braking, adaptive cruise control, and the like, are rendered possible by the brake-pressure control valve set-up(s).

The service brake unit may include a muscle-powered or auxiliary-force-powered master brake cylinder as a brake pressure generator; the latter meaning a muscle-powered master brake cylinder having a brake booster, such as a vacuum-pressure brake booster or an electromechanical brake booster. Auxiliary-force braking is to be distinguished from auxiliary braking by the auxiliary brake unit in response to failure of the service brake unit. In addition to, or instead of, the master brake cylinder, the service brake unit may include an externallypowered brake pressure generator, which may have, for example, a piston-cylinder unit, whose piston, for example, is displaceable in a cylinder with the aid of an electric motor, via a rotation-to-translation conversion gear. Another option for an externally-powered brake pressure generator is a hydraulic pump, which may be driven, for example, by an electric motor.

The auxiliary brake unit is used for actuating the wheel brake(s) in the case of a defect or a failure of the service brake unit; wheel brake pressures in the wheel brakes being able to be regulated by the brake-pressure control valve set-up of the service brake unit, when the brake-pressure control valve set-up is functional. Actuation of the brakes by the auxiliary brake unit in response to a defect or failure of the service brake unit is referred to as auxiliary braking. Because of the simple design, it is not normally provided that the auxiliary brake unit have a brake-pressure control valve set-up.

However, embodiments of the present invention are possible, in which both the service brake unit and the auxiliary brake unit have a brake-pressure control valve set-up.

The auxiliary brake unit includes an externally-powered brake pressure generator, which is connected to a brake fluid reservoir of the service brake unit via a check valve that is preferably situated in the service brake unit. Due to this, in order to build up brake pressure in the case of auxiliary braking, the externally-powered brake pressure generator of the auxiliary brake unit does not have to draw brake fluid in from the brake fluid reservoir of the service brake unit, through the master brake cylinder of the service brake unit, at a high flow resistance, but is able to draw in the brake fluid from the brake fluid reservoir of the service brake unit, through the check valve, at a low flow resistance. This improves the suction action and allows a rapid build-up of brake pressure by the externally-powered brake pressure generator of the auxiliary brake unit during auxiliary braking, in particular, in the case of viscous brake fluid at a low temperature.

Advantageous embodiments and further refinements of the present invention are disclosed herein.

Preferably, the service brake unit and/or the auxiliary brake unit each include a hydraulic block. The hydraulic block is a component, which has mostly the shape of a right parallelpiped and is generally made of metal, but may also be made of a different material, such as plastic. Blind-end bores are introduced in the hydraulic block as receptacles for hydraulic components of the vehicle brake system. Such components include solenoid valves, whose hydraulic parts are typically situated in the respective receptacle of the hydraulic block, and whose electromechanical parts, such as an armature and magnetic coil, protrude from the hydraulic block. The hydraulic parts of a solenoid valve are the actual valve per se, thus, for example, a valve housing having a blocking member and a valve seat. Furthe hydraulic components include, inter alia, piston-cylinder units, hydraulic pumps, hydraulic reservoirs, check valves and parts of pump drives. In addition, such hydraulic blocks include blind-end bores for connecting brake lines via screw nipples or press-in (self-clinching) nipples. The blind-end bores forming the receptacles for the hydraulic components are mostly stepped in diameter. By drilling the hydraulic block, the receptacles for the hydraulic components are interconnected in accordance with a hydraulic connection diagram of the vehicle brake system and/or of the service brake unit and/or of the auxiliary brake unit, which may be referred to as a (hydraulic) circuit. The drilling of the hydraulic block is mostly Cartesian, that is, the bores are parallel and perpendicular to each other, and, in a hydraulic block having the shape of a right parallelpiped, they are parallel and perpendicular to faces and edges of the hydraulic block. Fitted with the hydraulic components, possibly one or more electric motors for driving the externally-powered brake pressure generator, an electronic control unit, etc., the hydraulic blocks form the service brake unit and/or the auxiliary brake unit. "Fitted" means that the hydraulic components are situated in their receptacles in the hydraulic blocks, and that the electric motors and the control unit(s) are positioned on the hydraulic blocks.

In specific embodiments of the present invention, all of the features revealed in the description and the figures may be implemented individually by themselves or, in principle, in any desired combination. Variants of the present invention, which do not include all of the features, but only one or more of them, are possible.

BRIEF DESCRIPTION OF THE DRAWINGS

In the following, the present invention is described in greater detail in light of specific example embodiments shown in the figures.

DETAILED DESCRIPTION OF EXAMPLE EMBODIMENTS

Figure 1:
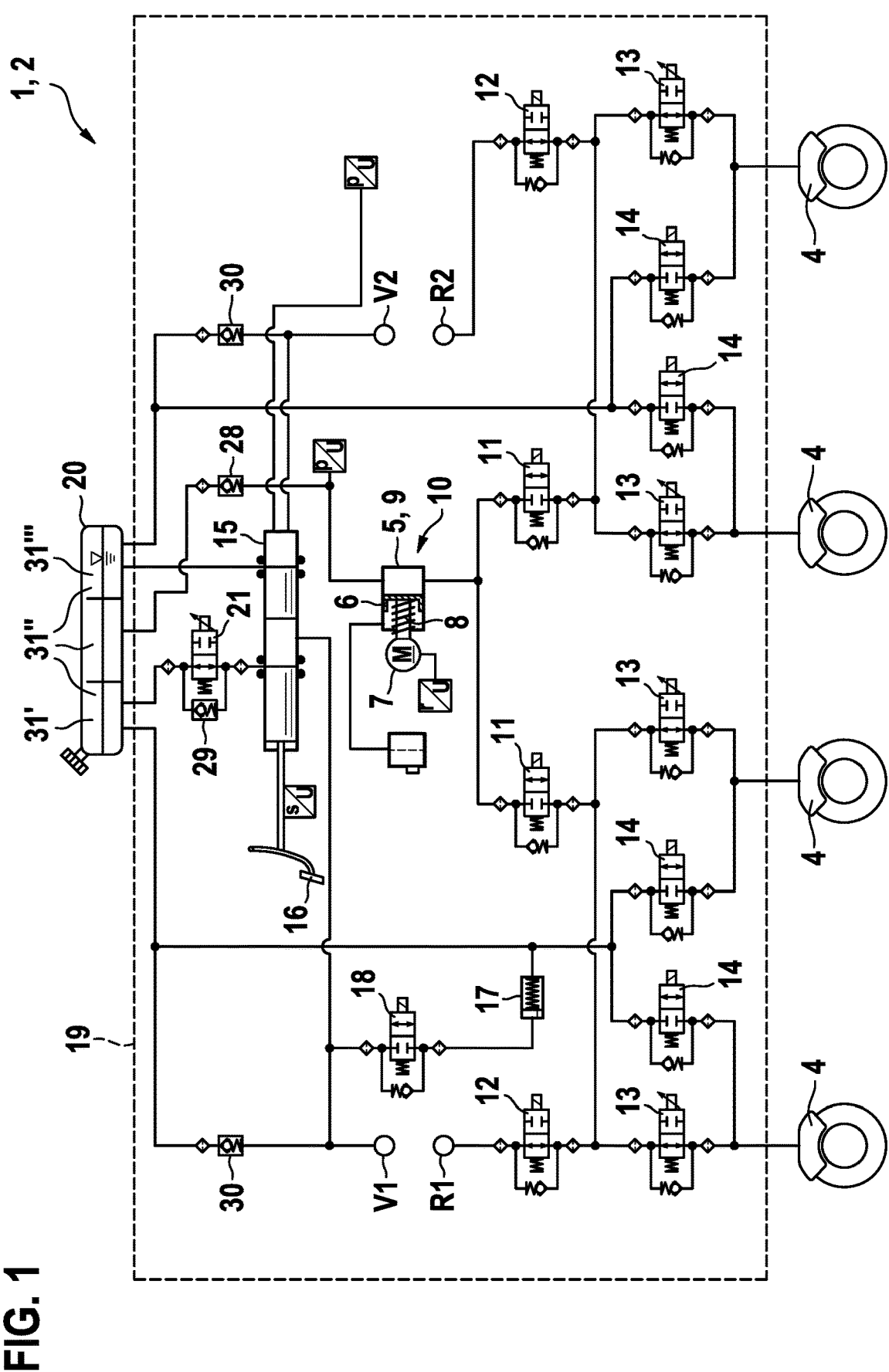
FIG. 1 shows a hydraulic circuit diagram of a service brake unit of an electrohydraulic power brake system according to an example embodiment of the present invention.
Figure 2:
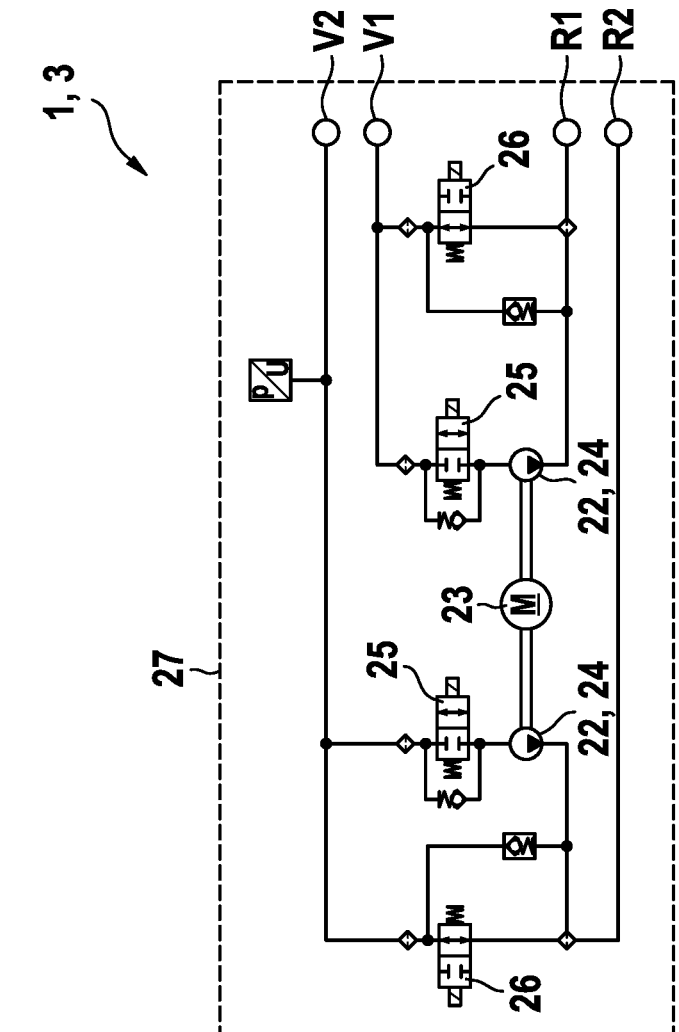
FIG. 2 shows a hydraulic circuit diagram of an auxiliary brake unit of the electrohydraulic power brake system from FIG. 1.

The electrohydraulic power brake system 1 of the present invention represented in the figures is intended for a motor vehicle, namely, a passenger car, traveling autonomously up to Level 4 or 5. Level 4 means autonomous driving, where a driver may be called upon to take action, and Level 5, the highest level, means autonomous driving, which does not require any intervention by a driver.

Power brake system 1 includes a service brake unit 2 and an auxiliary brake unit 3. Service brake unit 2 is intended for actuating the brakes, and auxiliary brake unit 3 is intended for actuating the brakes in the case of a defect or failure of service brake unit 2. Hydraulic wheel brakes 4 are connected to service brake unit 2 by brake lines, in the exemplary embodiment, four brake lines. Auxiliary brake unit 3 is connected to service brake unit 2 by brake lines in such a manner, that wheel brakes 4 may also be actuated by auxiliary brake unit 3. In each instance, service brake unit 2 and auxiliary brake unit 3 are separate modules, which may be situated in different places, such as in an engine compartment of the passenger car. In the following, the brake lines, which connect auxiliary brake unit 3 to service brake unit 2, are also referred to as forward lines V1, V2 and return lines R1, R2.

The vehicle brake system 1 of the present invention is constructed as a dual-circuit brake system, and its brake units 2, 3 are constructed as dual-circuit brake units. In each instance, two wheel brakes 4 are assigned to a brake circuit. In each brake circuit, auxiliary brake unit 3 is connected to service brake unit 2 by a forward line V1, V2 and by a return line R1, R2. In service brake unit 2 and in auxiliary brake unit 3, connecting points of forward lines V1, V2 and return lines R1, R2 are denoted consistently by V1, V2, R1 and R2.

Service brake unit 2 includes a piston-cylinder unit 5, whose piston 6 is displaceable in a cylinder 9 by an electric motor 7 via a screw drive 8, in the form of a rotation-to-translation conversion gear. Electric motor 7, screw drive 8, and pistoncylinder unit 5 form an externally-powered brake pressure generator 10 of service brake unit 2 for generating a brake pressure for service braking. Service braking is the usual and intended brake actuation. Externally-powered brake pressure generator 10 is connected to the two brake circuits via servicebrake valves 11, between separating valves 12 and intake valves 13.

For each wheel brake 4, service brake unit 2 includes an intake valve 13 and an exhaust valve 14, with the aid of which wheel brake pressures in each wheel brake 4 may be adjusted individually. Due to this, the wheel brake pressures in wheel brakes 4, and consequently, the braking forces of wheel brakes 4, may be adjusted without slippage during normal vehicle operation. In addition, traction control systems, such as antilock and drive slip control, electronic stability programs, which are also referred to colloquially as anti-skid control systems, automatic braking, adaptive cruise control, and the like, are more possible. Such control systems are conventional and are not explained here in more detail. Intake valves 13 and exhaust valves 14 may also be viewed as wheel-brake pressure control valve set-ups 13, 14.

In addition to externally-powered brake pressure generator 10, service brake unit 2 includes a master brake cylinder 15, which may be actuated by muscle power, and to which wheel brakes 4 are connected via separating valves 12 and intake valves 13. Service brake unit 2 includes a separating valve 12 in each brake circuit, as well as an intake valve 13 and an exhaust valve 14 for each wheel brake 4. In the case of operation by a driver, master brake cylinder 15 is used as a setpoint adjuster for the wheel brake pressures to be set in wheel brakes 4 during service braking. The brake pressure is generated by externally-powered brake pressure generator 10 during both operation by a driver and autonomous driving. During service braking, master brake cylinder 15 is separated hydraulically from wheel brakes 4, by closing separating valves 12.

As mentioned, master brake cylinder 15 is used as a setpoint adjuster for the wheel brake pressures in the event of service braking during operation by a driver, where the brake pressure is generated by externally-powered brake pressure generator 10 of service brake unit 2. In the event of a failure of externally-powered brake pressure generator 10, the brake pressure may be generated by actuating master brake cylinder 15. This is socalled auxiliary braking by muscle power, and therefore, master brake cylinder 15 may also be viewed as a muscle-powered brake pressure generator.

In order for brake fluid to be able to displaced from master brake cylinder 15, and for pistons of master brake cylinder 15 and a brake pedal 16 to be able to be moved when separating valves 12 are closed, service brake unit 2 includes a pedal travel simulator 17, which is connected to a brake circuit of master brake cylinder 15 via a simulator valve 18. Pedal travel simulator 17 is a piston-cylinder unit having a spring-loaded or also, for example, gas-pressurized, piston.

In the specific embodiment of the present invention described and shown, in their currentless initial states, separating valves 12 and intake valves 13 are open 2/2-way-solenoid valves; and in their currentless initial states, service brake valves 11 of externally-powered brake pressure generator 10, exhaust valves 14, and simulator valve 18 are closed 2/2-way solenoid valves.

The hydraulic components of service brake unit 2 of the electrohydraulic power brake system 1 according to the present invention, namely, valves 11, 12, 13, 14, 18, externally-powered brake pressure generator 10, master brake cylinder 15, pedal travel simulator 17, and further components, such as pressure sensors, are situated in receptacles of a hydraulic block 19 of service brake unit 2 and are interconnected by holes drilled into hydraulic block 19 in accordance with the shown hydraulic circuit diagram of vehicle brake system 1 and/or of service brake unit 2.

An unpressurized brake fluid reservoir 20, as is in conventional master brake cylinders, is mounted on hydraulic block 19, and master brake cylinder 15 is connected to the brake fluid reservoir, and externally-powered brake pressure generator 10 is connected to the same via a check valve 28. In one of the two brake circuits, a test valve 21 is provided between brake fluid reservoir 20 and master brake cylinder 15. In the exemplary embodiment, the test valve is also a 2/2-way solenoid valve open in its currentless initial state. A check valve 29, through which flow may occur in the direction of master brake cylinder 15, but which is not present in all variants of the present invention, is connected hydraulically in parallel with test valve 21.

In each of its two brake circuits, auxiliary brake unit 3 includes a hydraulic pump 22, which may be driven by a common electric motor 23. Hydraulic pumps 22 are piston pumps, although other hydraulic pumps, such as gear pumps, are possible as well. Hydraulic pumps 22 form, together with electric motor 23, an externally-powered brake pressure generator 24.

Suction sides of hydraulic pumps 22 of auxiliary brake unit 3 are connected to the two brake circuits of master brake cylinder 15 of service brake unit 2 via suction valves 25 and the above-mentioned brake lines, namely, forward lines V1, V2, with the aid of which auxiliary brake unit 3 is connected to service brake unit 2. Pressure sides of hydraulic pumps 22 of auxiliary brake unit 3 are connected to the two brake circuits of master brake cylinder 15 of service brake unit 2 via pressure valves 26 and forward lines V1, V2. In addition, the pressure sides of hydraulic pumps 22 of auxiliary brake unit 3 are connected to separating valves 12 of service brake unit 2 via brake lines, namely, return lines R1, R2, by which auxiliary brake unit 3 is connected to service brake unit 2. Due to this, it is possible to actuate wheel brakes 4 by generating brake pressure, using hydraulic pumps 22 of auxiliary brake unit 3, which form its externally-powered brake pressure generator 24. Wheel brake pressures in wheel brakes 4 may be adjusted, using intake valves 13 and exhaust valves 14 of service brake unit 2, which form the wheel-brake pressure control valve set-ups, provided these valves 13, 14 and their control systems are functional. In the case of a defect or a failure of service brake unit 2, the brake pressure is generated by the hydraulic pumps 22 of auxiliary brake unit 3, which form externally-powered brake pressure generator 24. Such braking is referred to as auxiliary braking.

In the specific embodiment of the present invention described and shown, suction valves 25 of auxiliary brake unit 3 are constructed as 2/2-way solenoid valves closed in their currentless initial states, and pressure valves 26 are constructed as 2/2-way solenoid valves open in their currentless initial states. In the case of auxiliary braking, suction valves 25 are open, so that hydraulic pumps 22 of auxiliary brake unit 3 may draw in brake fluid from brake fluid reservoir 20 of service brake unit 2, through master brake cylinder 15. In addition, pressure valves 26 are closed, in order to apply a brake pressure to wheel brakes 4.

In the case of service braking, a brake pressure generated by externally-powered brake pressure generator 10 of service brake unit 2 is applied to wheel brakes 4 through open pressure valves 26 of auxiliary brake unit 3 and, in this case, through to-be-opened service brake valves 11 of service brake unit 2; or a brake pressure generated by master brake cylinder 15 is applied to the wheel brakes through open pressure valves 26 of auxiliary brake unit 3 and open separating valves 12 of service brake unit 2.

To build up brake pressure rapidly during auxiliary braking, hydraulic pumps 22, which form externally-powered brake pressure generator 24 of auxiliary brake unit 3, are connected to brake fluid reservoir 20 of service brake unit 2 via check valves 30, which, in the exemplary embodiment, are situated in the hydraulic block 19 of service brake unit 2.

Variants of electrohydraulic power brake system 1 of the present invention, which have only one of the two check valves 30 between brake fluid reservoir 20 and hydraulic pumps 22 of auxiliary brake unit 3, are also possible; in this case, the check valve 30 in the primary circuit and/or the check valve 30 in the brake circuit, in which test valve 21 is also provided, being preferably present. The primary circuit is the brake circuit, which is operated directly via a pedal rod, using brake pedal 16.

The check valve 29, which is connected in parallel with test valve 21 between brake fluid reservoir 20 and master brake cylinder 15, may be omitted, in particular, if hydraulic pumps 22 of auxiliary brake unit 3 in the two brake circuits are connected to brake fluid reservoir 20 of service brake unit 2 via a check valve 30.

The hydraulic components of auxiliary brake unit 3, namely, hydraulic pumps 22, valves 25, 26, and further components, such as pressure sensors, are situated in a hydraulic block 27 of auxiliary brake unit 3 and are interconnected by holes drilled into hydraulic block 27 in accordance with the shown hydraulic circuit diagram, which may also be referred to as the interconnection configuration of hydraulic components 22, 25, 26.

Brake fluid reservoir 20 includes a chamber 31', 31" for each brake circuit, as well as a further chamber 31''' for externallypowered brake pressure generator 10 of service brake unit 2, thus, a total of three chambers 31', 31", 31'''. The check valve 30, via which a hydraulic pump 22 of auxiliary brake unit 3 is connected to brake fluid reservoir 20, is connected to the same chamber 31' of brake fluid reservoir 20 as test valve 21. Hydraulic pumps 22 of auxiliary brake unit 3, that is, the two check valves 30, via which hydraulic pumps 22 of auxiliary brake unit 3 are connected to brake fluid reservoir 20, are connected to different chambers 31', 31" of brake fluid reservoir 20. Externally-powered brake pressure generator 10 of service brake unit 2 is connected to a separate chamber 31", that is to a chamber 31" of brake fluid reservoir 20 different from those of hydraulic pumps 22 of auxiliary brake unit 3.

Figure 3:
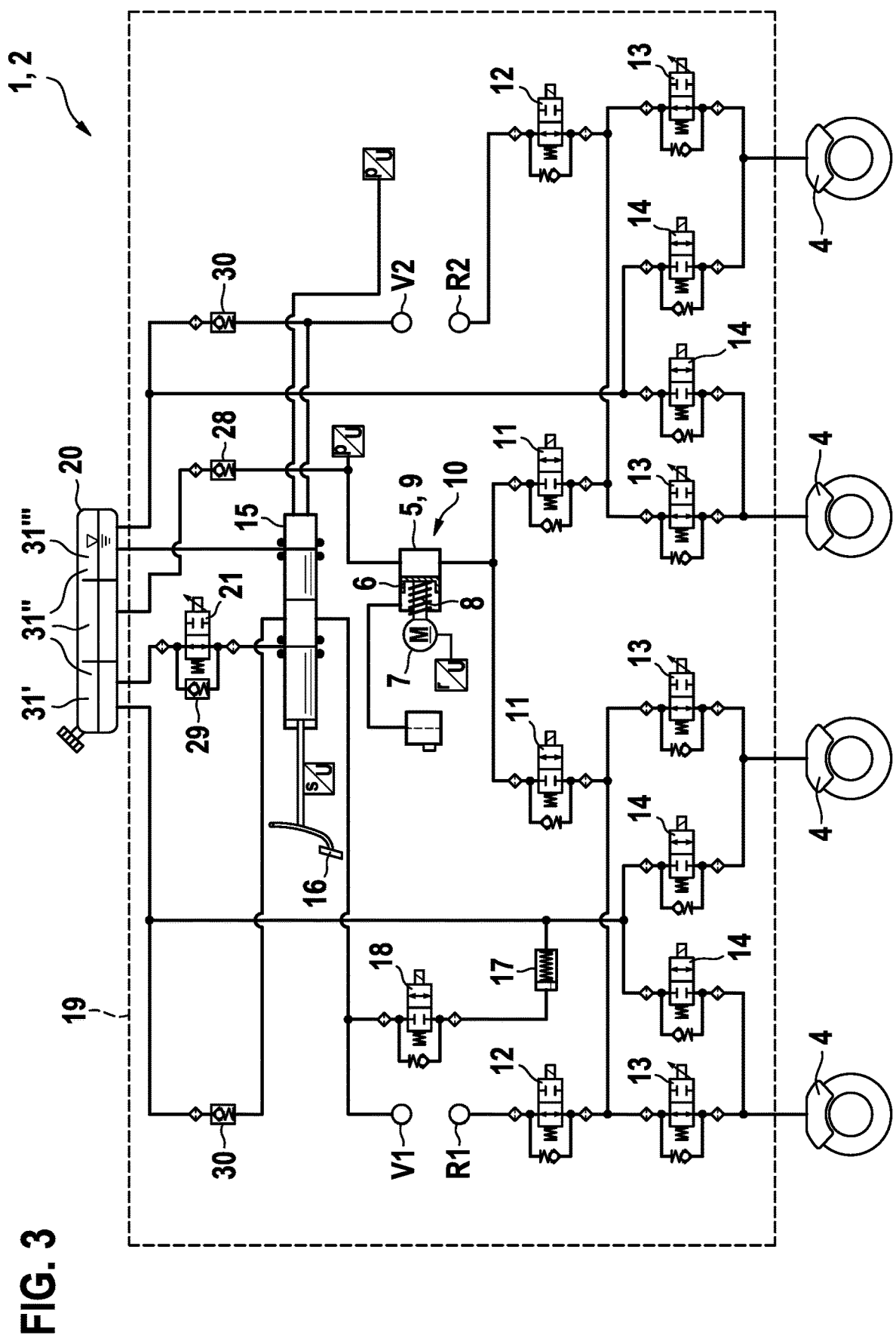
FIG. 3 shows a hydraulic circuit diagram of the service brake unit of the electrohydraulic power brake system according to an example embodiment of the present invention, modified in comparison with FIG. 1.

In comparison with FIG. 1, in FIG. 3, forward line V1 of the one brake circuit, in the exemplary embodiment, the primary circuit, is not connected directly to brake fluid reservoir 20 via check valve 30, but via master brake cylinder 15. In all other respects, FIGS. 1 and 3 are consistent.

What is claimed is:

1. An electrohydraulic power brake system for a motor vehicle traveling autonomously, comprising:
    a brake fluid reservoir;
    a service brake unit:
        (I) that is connected to the brake fluid reservoir;
        (II) to which at least one hydraulic wheel brake is connected; and
        (III) that includes (i) a first brake pressure generator configured to generate a brake pressure and (ii) a wheel-brake pressure control valve set-up that includes (a) at least one inlet valve by which the generated brake pressure is appliable to the at least one hydraulic wheel brake and (b) at least one outlet valve, wherein an extent of the application of the generated brake pressure to the at least one hydraulic wheel brake is regulatable via the at least one inlet valve and the at least one outlet valve; and
    an auxiliary brake unit, wherein the auxiliary brake unit includes a second brake pressure generator:
        (I) configured to generate a brake pressure provided at an outlet or pressure side of the second brake pressure generator;
        (II) arranged for application of the brake pressure that is provided at the outlet or pressure side of the second brake pressure generator to the at least one hydraulic wheel brake via the at least one inlet valve of the wheel-brake pressure control valve set-up of the service brake unit in an event of failure of the service brake unit; and
        (III) an intake or suction side of which is connected, via a first check valve, to the brake fluid reservoir to which the service brake unit is connected;
    wherein the electrohydraulic power brake system includes at least one of the following features (I)-(II):
        (I) the vehicle brake system includes a plurality of brake circuits in both of which the first brake pressure generator is configured to generate the brake pressure, the auxiliary brake unit includes a third brake pressure generator, the second and third brake pressure generators are arranged in different ones of the brake circuits so that each of the second and third brake pressure generators is able to generate respective brake pressure in only different respective ones of the brake circuits, and an intake or suction side of the third brake pressure generator is connected to the brake fluid reservoir, to which the service brake unit is connected, via another check valve; and
        (II) the service brake unit includes a master brake cylinder that is actuatable by muscle power and is connected to the brake fluid reservoir via a test valve.

2. The electrohydraulic power brake system as recited in claim 1, wherein the vehicle brake system includes the plurality of brake circuits in both of which the first brake pressure generator is configured to generate the brake pressure, the auxiliary brake unit includes the third brake pressure generator, the second and third brake pressure generators are arranged in different ones of the brake circuits so that each of the second and third brake pressure generators is able to generate the respective brake pressure in only the different respective ones of the brake circuits, and the intake or suction side of the third brake pressure generator is connected to the brake fluid reservoir, to which the service brake unit is connected, via the other check valve.

3. The electrohydraulic power brake system as recited in claim 1, wherein the service brake unit includes the master brake cylinder that is actuatable by muscle power and is connected to the brake fluid reservoir via the test valve.

4. The electrohydraulic power brake system as recited in claim 1, wherein the first brake pressure generator is motor powered.

5. The electrohydraulic power brake system as recited in claim 1, wherein the second brake pressure generator is motor powered.

6. The electrohydraulic power brake system as recited in claim 5, wherein the first brake pressure generator is motor powered.

7. The electrohydraulic power brake system as recited in claim 1, wherein the second brake pressure generator includes a hydraulic pump for the brake pressure generation of the second brake pressure generator.

8. The electrohydraulic power brake system as recited in claim 7, wherein:
    the second brake pressure generator is arranged for the application of the brake pressure that is provided at the pressure side of the second brake pressure generator, which is a pressure side of the hydraulic pump, to the at least one hydraulic wheel brake; and
    the suction side of the second brake pressure generator, which is a suction side of the hydraulic pump, is connected via the first check valve to the brake fluid reservoir.

9. An electrohydraulic power brake system, comprising:
    a brake fluid reservoir;
    a service brake unit to which at least one hydraulic wheel brake is connected, and that includes (I) a first brake pressure generator configured to generate a brake pressure, (ii) (II) a wheel-brake pressure control valve set-up via which an application of the generated brake pressure to the at least one hydraulic wheel brake is regulatable, and (III) a master brake cylinder that is actuatable by muscle power and is connected to the brake fluid reservoir; and
    an auxiliary brake unit;
    wherein:
        the auxiliary brake unit includes a second brake pressure generator that is configured to generate a brake pressure to actuate the at least one hydraulic wheel brake in an event of failure of the service brake unit, and that is connected, via a check valve, to the brake fluid reservoir to which the service brake unit is connected; and
        either:
            (I) the master brake cylinder is connected to a line at an output side of the check valve, and the master brake cylinder is connected to the auxiliary brake unit in such a manner that the second brake pressure generator of the auxiliary brake unit is connected to the brake fluid reservoir via each of the check valve and the master brake cylinder separately and in parallel; or (II) the connection of the master brake cylinder to the brake fluid reservoir is via a test valve, the brake fluid reservoir includes a plurality of chambers, and the check valve is connected to the same chamber of the brake fluid reservoir as the test valve.

10. The electrohydraulic power brake system as recited in claim 9, wherein the master brake cylinder is connected to the line at the output side of the check valve, and the master brake cylinder is connected to the auxiliary brake unit in the manner that the second brake pressure generator of the auxiliary brake unit is connected to the brake fluid reservoir via each of the check valve and the master brake cylinder separately and in parallel.

11. The electrohydraulic power brake system as recited in claim 9, wherein the connection of the master brake cylinder to the brake fluid reservoir is via the test valve, the brake fluid reservoir includes the plurality of chambers, and the check valve is connected to the same chamber of the brake fluid reservoir as the test valve.

12. The electrohydraulic power brake system as recited in claim 11, wherein the auxiliary brake unit includes a third brake pressure generator connected to the brake fluid reservoir via a second check valve, and the check valves are connected to different chambers of the brake fluid reservoir that each other.

13. An electrohydraulic power brake system for a motor vehicle traveling autonomously, comprising:
   a service brake unit:
      (I) in which a check valve is situated;
      (II) that has a brake fluid reservoir;
      (III) to which at least one hydraulic wheel brake is connected;
      (IV) that has a brake pressure generator configured to generate a brake pressure connected to the brake fluid reservoir;
      (V) that includes a wheel-brake pressure control valve set-up configured to regulate a wheel brake pressure applied to the at least one hydraulic wheel brake; and
      (VI) that includes a master brake cylinder that is actuatable by muscle power and that is connected to the brake fluid reservoir, wherein the brake pressure generator is configured to generate a brake pressure with brake fluid from the brake fluid reservoir and is isolated from the master brake cylinder so that the muscle power does not hydraulically cause a pressure build-up by the brake pressure generator; and
   an auxiliary brake unit:
      (I) which is connected to the service brake unit, so that in the event of failure of the service brake unit, the at least one wheel brake is actuatable by the auxiliary brake unit; and
      (II) that includes an externally-powered brake pressure generator that:
         (i) is configured to generate a brake pressure to actuate the at least one hydraulic wheel brake;
         (ii) is connected to the brake fluid reservoir of the service brake unit for receiving brake fluid via the check valve; and
         (iii) is connected to master brake cylinder for receiving brake fluid under the muscle power applied to the master brake cylinder.

14. The electrohydraulic power brake system as recited in claim 13, wherein:
   the first brake pressure generator is connected to the brake fluid reservoir via a second check valve; and
   the externally-powered brake pressure generator is: configured to generate the brake pressure to actuate the at least one hydraulic wheel brake in an event of failure of the service brake unit.

15. The electrohydraulic power brake system as recited in claim 13, wherein the brake fluid reservoir includes the plurality of chambers, and the first brake pressure generator of the service brake unit is connected to a chamber of the brake fluid reservoir different from the check valve.

\* \* \* \* \*